(12) United States Patent
Tak-Wei Hon

(10) Patent No.: US 7,614,632 B2
(45) Date of Patent: Nov. 10, 2009

(54) FOLDING BICYCLE

(76) Inventor: David Tak-Wei Hon, Bldg. DA HON, Furong Industrial Zone, Furong 6th R, Shajing Town, Bao An, Shenzhen, PR (CN) 518125

( * ) Notice: Subject to any disclaimer, the term of this patent is extended or adjusted under 35 U.S.C. 154(b) by 193 days.

(21) Appl. No.: 11/622,578

(22) Filed: Jan. 12, 2007

(65) Prior Publication Data

US 2008/0169624 A1 Jul. 17, 2008

(51) Int. Cl.
*B62K 19/00* (2006.01)
*B62K 17/00* (2006.01)
(52) U.S. Cl. .................. 280/278; 280/287; 280/279
(58) Field of Classification Search .......... 280/278, 280/287, 279
See application file for complete search history.

(56) References Cited

U.S. PATENT DOCUMENTS

| | | | | |
|---|---|---|---|---|
| 3,990,717 A | * | 11/1976 | Best | 280/278 |
| 4,433,852 A | * | 2/1984 | Hon | 280/278 |
| 4,448,435 A | * | 5/1984 | Hon | 280/278 |
| 4,462,606 A | * | 7/1984 | Hon | 280/278 |
| 4,566,713 A | * | 1/1986 | Hon | 280/287 |
| 4,813,549 A | * | 3/1989 | Valdivia | 211/17 |
| 5,269,550 A | * | 12/1993 | Hon et al. | 280/278 |
| 5,397,146 A | * | 3/1995 | Fischer | 280/288.4 |
| 6,267,401 B1 | * | 7/2001 | De Jong | 280/287 |
| 2004/0007848 A1 | * | 1/2004 | Sinyard et al. | 280/279 |
| 2005/0001404 A1 | * | 1/2005 | Mihelic | 280/278 |
| 2006/0197303 A1 | * | 9/2006 | Sinyard et al. | 280/276 |
| 2007/0222175 A1 | * | 9/2007 | Mihelic | 280/278 |
| 2008/0258424 A1 | * | 10/2008 | Paul | 280/276 |

\* cited by examiner

*Primary Examiner*—Christopher P Ellis
*Assistant Examiner*—Marlon A Arce
(74) *Attorney, Agent, or Firm*—Carstens & Cahoon LLP

(57) ABSTRACT

The present invention discloses a folding bicycle comprising a head and a frame, wherein the head includes a handlebar, a handlebar stem, a folding joint, and a front fork, and the front fork has two fork blades each of which is inwardly recessed. When the handlebar is folded downwards with the handlebar stem, the handlebar can be further folded and placed in the recess of the fork blade without interfering with the fork blade. Thus, the folding bicycle can be further folded with a less folded volume.

3 Claims, 3 Drawing Sheets

FOLDING BICYCLE

TECHNICAL FIELD

The present invention relates to a folding bicycle, particularly to a front fork of a folding bicycle.

BACKGROUND OF THE INVENTION

It is desired for a folding bicycle to be folded into a more and more compact size. In order to reduce the folded volume of a folding bicycle, a folding joint is usually disposed under the handlebar stem of the folding bicycle. Wherein, the handlebar can be folded downwards with the handlebar stem, and after being folded, the handlebar is placed on the fork blade of the front fork. However, the fork blade of the front fork is a straight-tube as viewed from the front. When the handlebar contacts with the fork blade, it is tilt supported. Therefore, the bicycle cannot be further folded and the folded volume is still rather large.

SUMMARY OF THE INVENTION

The object of the present invention is to provide a folding bicycle whose handlebar will not interfere with its fork blade when being folded so that the folded volume of the bicycle is smaller.

A folding bicycle of the present invention comprises a head and a frame, wherein the head includes a handlebar, a handlebar stem, a folding joint and a front fork, wherein said front fork has blades each of which is inwardly recessed.

Since the fork blade of the front fork of the folding bicycle is inwardly recessed, when the handlebar is folded downwards with the handlebar stem, the handlebar can be placed in the recess of the fork blade without interfering with the fork blade. Thus, the folding bicycle can be further folded with a less folded volume.

BRIEF DESCRIPTION OF THE DRAWINGS

The present invention is further explained by a preferred embodiment in combination with the accompanying drawings.

DETAIL DESCRIPTION OF THE PREFERRED EMBODIMENT

Figure 1:
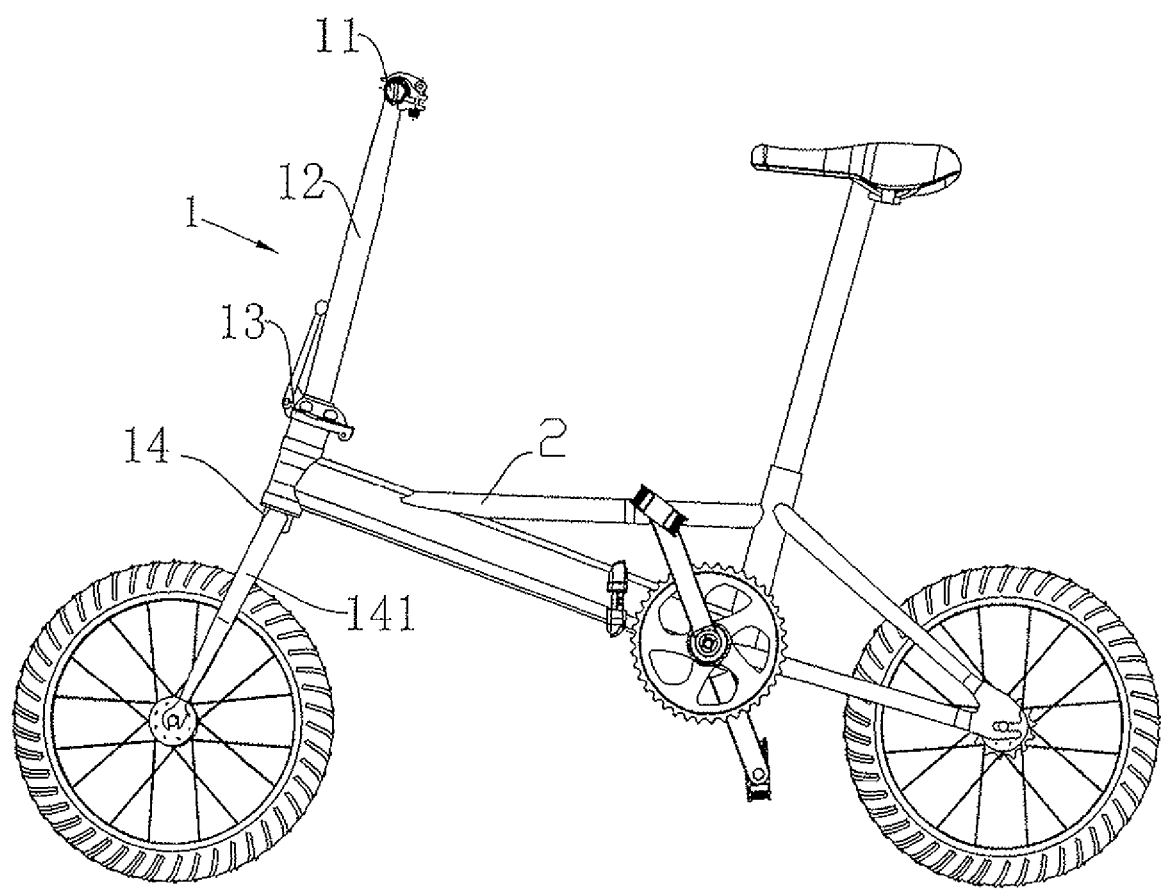
FIG. 1 is a schematic view of the folding bicycle according to one embodiment of the present invention.

The present invention will be illustrated in details referring to the embodiment as described below:

As shown in FIG. 1, according to one embodiment of the present invention, a folding bicycle comprises a head 1 and a frame 2, wherein the head 1 includes a handlebar 11, a handlebar stem 12, a folding joint 13, and a front fork 14, and the front fork 14 has two fork blades 141 each of which is inwardly recessed.

Figure 2:
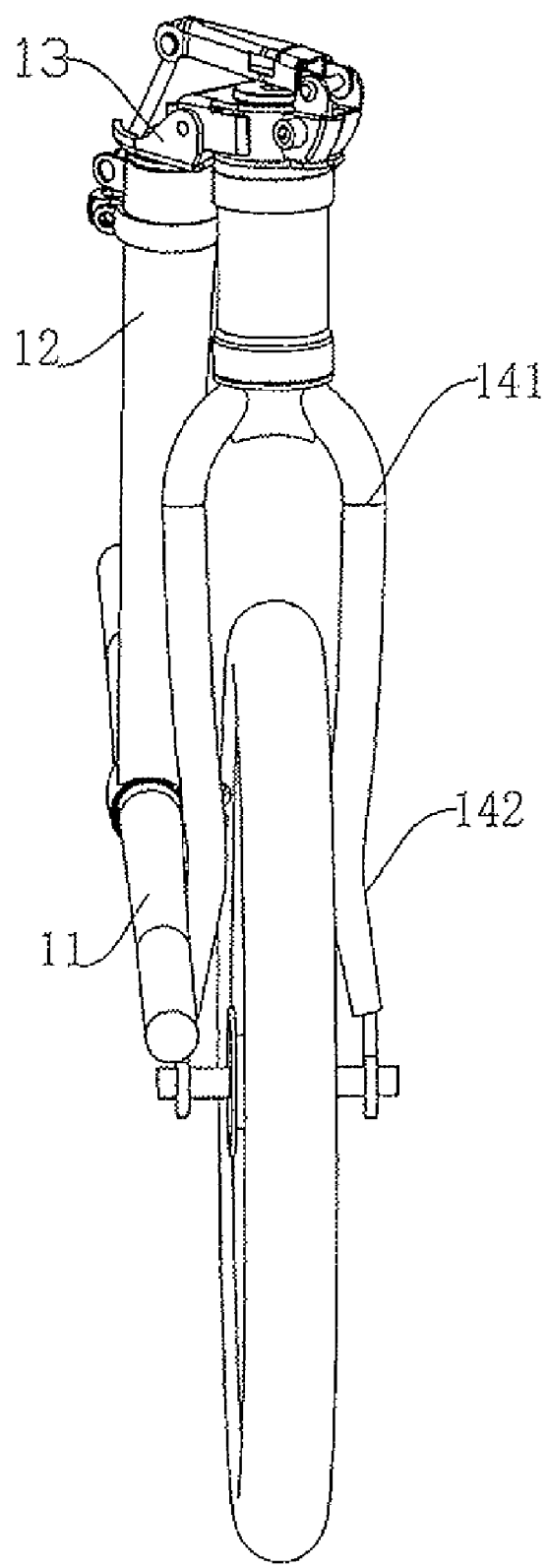
FIG. 2 is a schematic view of the folding bicycle as shown in FIG. 1 when it is in a folded state.

As shown in FIG. 2, when the handlebar stem 12 is in a folded state, the handlebar 11 can be further folded and placed in the inwardly recess 142 of the fork blade 141 without interfering with the fork blade 141. Thus, the folding bicycle can be further folded with a less folded volume.

Figure 3:
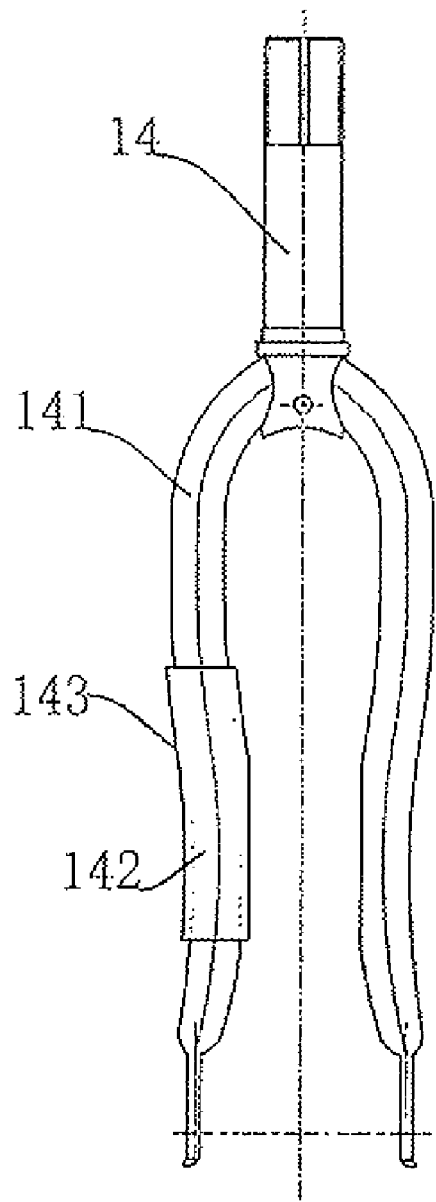
FIG. 3 is a schematic view of the front fork of the folding bicycle as shown in FIG. 1.

Since the handlebar 11 is placed in the inwardly recess 142, the collision and friction between the handlebar 11 and the inwardly recess 142 may cause surface crash or scrape to the handlebar 11 and the fork blade 141. In order to avoid surface damage, as shown in FIG. 3, a protection pad 143 made of elastic materials such as plastic, rubber, or rubber plastics compound covers the inwardly recess 142 of the fork blade of the front fork of the folding bicycle. When the handlebar 11 is folded downwards with the handlebar stem 12, the handlebar 11 will not directly contact with the inwardly recess of the fork blade, therefore the surface of the handlebar 11 and the surface of the fork blade 141 are well protected.

Figure 4:
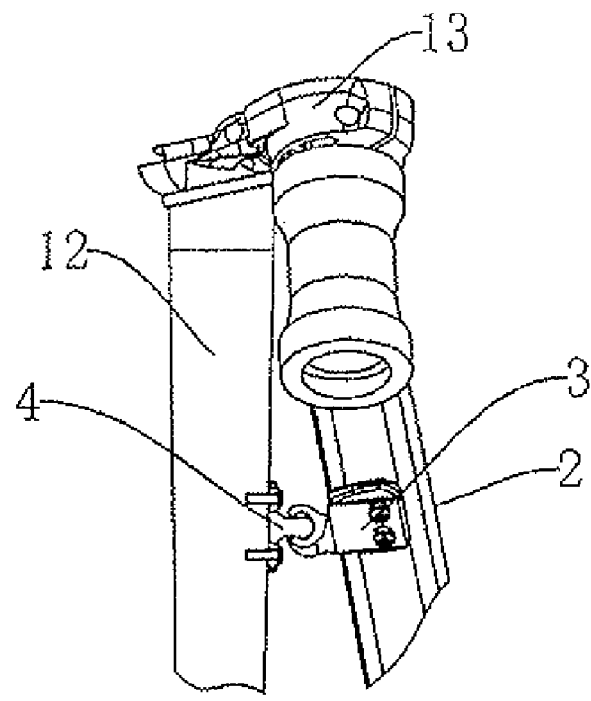
FIG. 4 is a schematic view of the folding bicycle according to another embodiment of the present invention.

As shown in FIG. 4, according to another embodiment, a folding bicycle further includes a fastener 3 in the frame 2 and a hook 4 in the handlebar stem 12, wherein the hook 4 can be engaged with the fastener 3 when the handlebar 11 is folded downwards. When the handlebar stem 12 is folded downwards, the hook 4 is engaged tightly with the fastener 3, thus the handlebar stem 12 and the handlebar 11 are well fixed, which prevents the handlebar stem 12 and the handlebar 11 from swaying after being folded.

What is claimed is:

1. A folding bicycle, comprising:
   a head (1), wherein the head (1) includes a handlebar (11), a handlebar stem (12), a folding joint (13) and a front fork (14);
   a frame (2);
   a fastener (3) in the frame (2); and
   a hook (4) in the handlebar stem (12);
   wherein the front fork (14) has two fork blades (141), at least one of which is inwardly recessed so as to form a recess (142) on the fork blade (141) such that, when the handlebar stem (12) is in a folded state, the handlebar (11) can be further folded and placed in the recess (142) without interfering with the fork blade (141); and
   wherein the hook (4) can be engaged with the fastener (3) when the handlebar (11) is folded downwards.

2. The folding bicycle according to claim 1, wherein the bicycle further comprises a protection pad (143) made of elastic materials which covers the recess (142) of the fork blade (141).

3. The folding bicycle according to claim 1, wherein the bicycle further comprises a protection pad (143) made of elastic materials which covers the recess (142) of the fork blade (141).

* * * * *